United States Patent
Anvari

(10) Patent No.: US 7,649,931 B1
(45) Date of Patent: Jan. 19, 2010

(54) EQUALIZER FILTER WITH DYNAMICALLY CONFIGURABLE CODE DOMAIN FILTER

(75) Inventor: Kiomars Anvari, 1567 Serafix Rd., Alamo, CA (US) 94507

(73) Assignee: Kiomars Anvari, Alamo, CA (US)

(*) Notice: Subject to any disclaimer, the term of this patent is extended or adjusted under 35 U.S.C. 154(b) by 629 days.

(21) Appl. No.: 11/647,497

(22) Filed: Dec. 29, 2006

(51) Int. Cl.
*H03H 7/30* (2006.01)

(52) U.S. Cl. ............ 375/229; 375/230; 375/232; 375/345; 455/114.3; 455/114.2; 455/127.2; 370/206

(58) Field of Classification Search .......... 455/114.3, 455/114.2, 127.2; 370/206
See application file for complete search history.

(56) References Cited

U.S. PATENT DOCUMENTS

| | | | |
|---|---|---|---|
| 7,142,831 B2* | 11/2006 | Anvari | 455/114.2 |
| 7,146,138 B2* | 12/2006 | Anvari | 455/114.3 |
| 7,391,713 B2* | 6/2008 | Anvari | 370/206 |
| 2004/0203540 A1* | 10/2004 | Anvari et al. | 455/114.3 |
| 2005/0085198 A1* | 4/2005 | Anvari | 455/114.3 |
| 2005/0118966 A1* | 6/2005 | Anvari | 455/127.2 |
| 2005/0136859 A1* | 6/2005 | Anvari | 455/114.3 |
| 2005/0141408 A1* | 6/2005 | Anvari | 370/206 |

* cited by examiner

*Primary Examiner*—Sudhanshu C Pathak

(57) ABSTRACT

A technique for an equalizer filter with dynamically configurable code domain filter is described. The input to a transmitter chain is modified by an equalizer filter with dynamically configurable code domain filter, prior to being applied to the transmitter. The equalizer filter with dynamically configurable code domain filter modifies and smoothen the amplitude of the signal. The modified and smoothen signal has its peaks reduced which results in lower Crest Factor with negligible degradation of Error Vector Magnitude of individual codes. The input to the equalizer filter with dynamically configurable code domain filter could be a baseband, an intermediate frequency (IF) or radio frequency (RF) signal. When the signal is an IF or RF signals it needs to be down converted to baseband before applied to the equalizer filter.

7 Claims, 5 Drawing Sheets though filter shown on FIG 3 is for CDMA2000 which provides 2 signal branches I and Q, the filtering approach for 4 signals I, Q in both positive and negative directions or more branches is obvious and straight forward. The figure below is only for description purpose. It should not be used to limit the claims of this invention to only 2 branches.

EQUALIZER FILTER WITH DYNAMICALLY CONFIGURABLE CODE DOMAIN FILTER

BACKGROUND OF INVENTION

The present invention relates to an equalizer filter with dynamically configurable code domain filter to boost the performance of any Code Division Multiplexing Access (CDMA) communication transmitter. The equalizer filter with dynamically configurable code domain filter's input could be baseband, intermediate frequency (IF), or RF signal and its output is the peak reduced and smoothen baseband signal that can be up converted to IF or RF. In any CDMA communication system one of the critical sub-systems is the transmitter. This sub-system has a major contribution in cost, power consumption, and size of the system. The main reason is the requirement of communication transmitter sub-system for linear components. The higher the linearity, the higher the power consumption, cost and size. In order to minimize the cost, size and power consumption there is a need for techniques that overcome this problem. This invention conquers these challenges by using a simple and accurate reconditioning equalizer filter module used at the input to this sub-system.

SUMMARY OF INVENTION

According to the invention, an equalizer filter with dynamically configurable code domain filter, for use with CDMA communication transmitter sub-system, uses a plurality of simple and accurate algorithm in conjunction with intelligent signal processing to improve signal handling of any wireless, optical, or wireline communication transmitter. By intelligent, it is meant that the algorithm has features of maintaining the signal emission and quality requirements while applying the equalizer filter with dynamically configurable code domain filter. The equalizer filter with dynamically configurable code domain filter uses the transmitter sub-system input which could be a baseband, an IF or RF signal as its input and conditions and smoothens the signal before applying it back to the transmitter sub-system. The conditioning and smoothening helps to boost the power handling of the transmitter sub-system or acts more linearly. The input to the equalizer filter with dynamically configurable code domain filter should be within a limit that can be handled by the equalizer filter.

In a particular embodiment, the equalizer filter algorithm with dynamically configurable code domain filter comprises a signal processing module. The signal processor performs the signal conditioning and smoothening.

The invention will be better understood by reference to the following detailed description in conjunction with the accompanying drawings.

DESCRIPTION OF THE SPECIFIC EMBODIMENTS

In a first preferred embodiment of the invention, the equalizer filter with dynamically configurable code domain filter uses sub-harmonic sampling to convert RF or IF signals to digital baseband signal. In a second preferred embodiment the main baseband signal is amplitude conditioned and smoothened using an equalizer filter with dynamically configurable code domain filter. In a third embodiment an equalizer filter injects in band and out of band signal into the main baseband signal using a feedforward loop. In a fourth embodiment the injected in band and out of band signal into the main baseband signal is adjusted by a dynamically configurable code domain filter in a feedforward loop. In a fifth embodiment the injected in band and out of band signal into the main baseband signal is gain adjusted in a feedforward loop. In a sixth embodiment a dynamically configurable code domain filter in a feedforward loop uses baseband signal to code domain conversion and code domain to baseband signal conversion. In a seventh embodiment a dynamically configurable code domain filter uses a dynamically configurable mask to provide weighting parameters and values. In an eighth embodiment a dynamically configurable mask gets its input from a CDMA modem to dynamically configure a code domain filter. In a ninth embodiment a dynamically configurable mask gets its input from a CDMA detector or baseband to code domain converter to dynamically configure a code domain filter. In a tenth embodiment the output information of a detector or baseband to code domain converter is used to dynamically configure a mask. In an eleventh embodiment a detector or baseband to code domain converter uses the output of a CDMA modem as its input. In a twelfth embodiment the out put of an equalizer filter with dynamically configurable code domain filter is used as the new input to the transmit sub-system.

Figure 1:
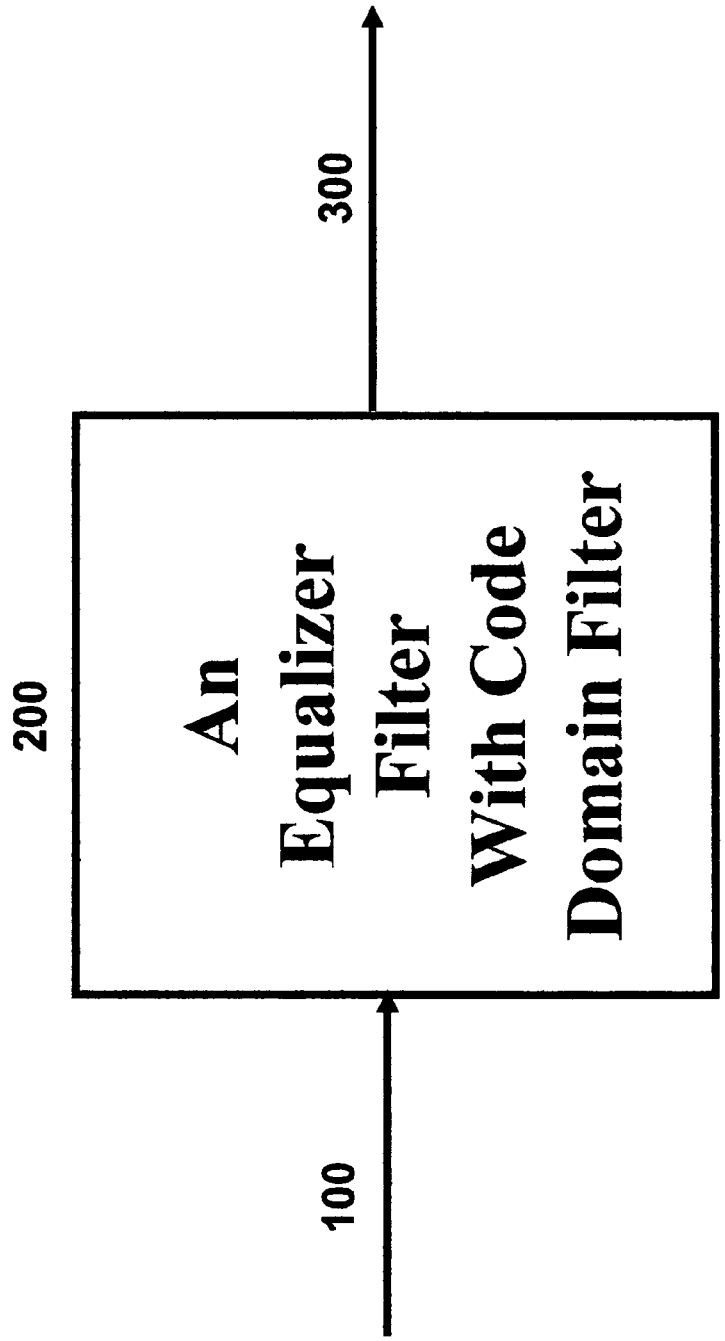
FIG. 1 is an overall block diagram of the equalizer filter

Referring to FIG. 1, the block diagram an equalizer filter with dynamically configurable code domain filter for CDMA signal is illustrated. The equalizer filter 200 receives its baseband input 100 and produce conditioned and smoothened output baseband signal 300. The conditioning equalizer filter with dynamically configurable code domain filter performs the following functions:

1. Conditions and smoothens the amplitude of the input baseband signal 100 before applying it to transmitter sub-system.
2. Adjusts the gain in the signal paths to keep the total gain from input to output of the equalizer filter with dynamically configurable code domain filter unity.

Figure 2:
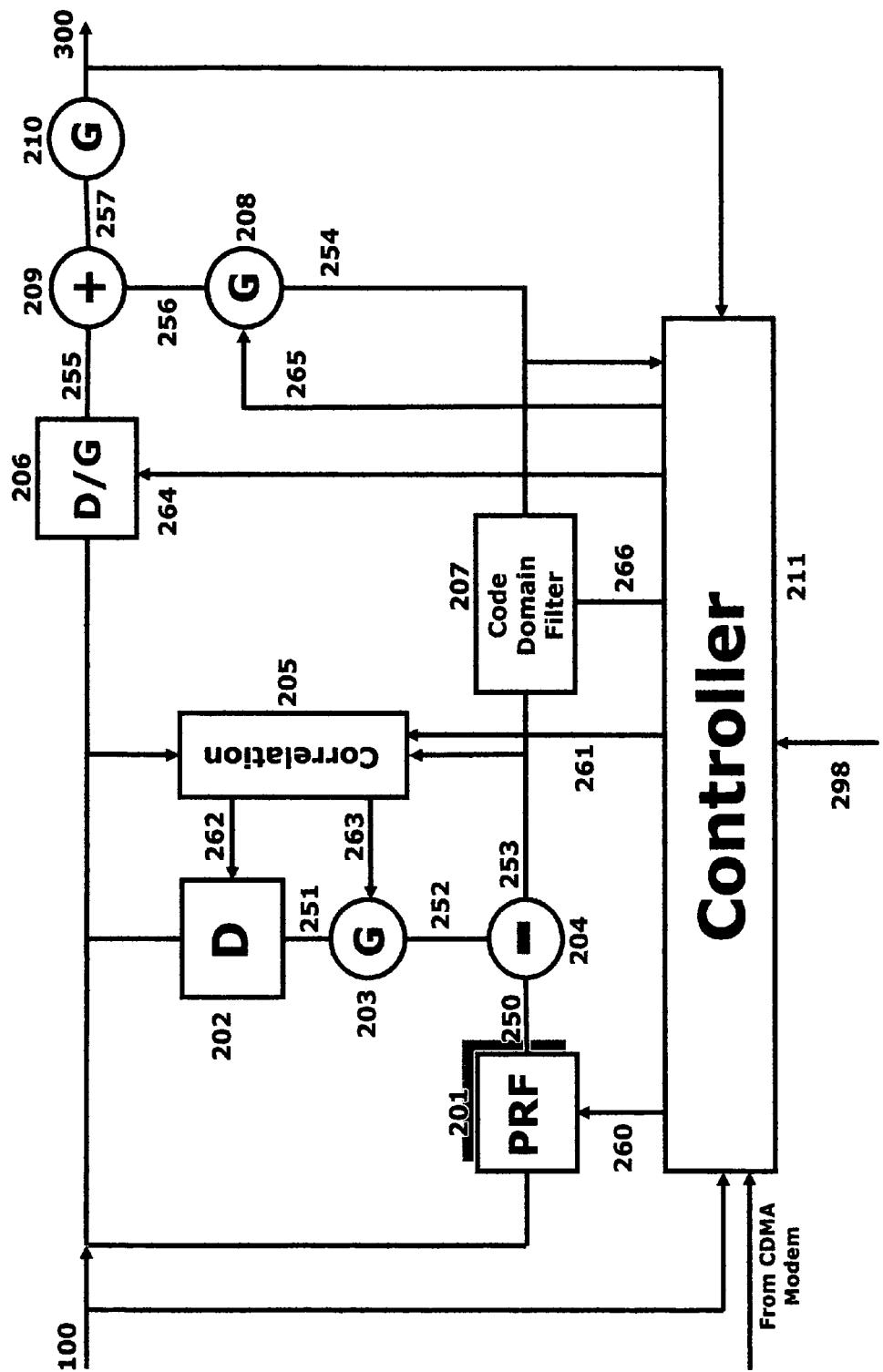
FIG. 2 is the detail block diagram of the equalizer filter with dynamically configurable code domain filter in a feedforward loop

FIG. 2 illustrates the detail block diagram of the equalizer filter for CDMA signals with dynamically configurable code domain filter. The received main baseband signal 100 is applied to Peak Reduction Filter (PRF) 201 to produce peak reduced main baseband signal 250. The PRF 201 receives control signal 260 from controller 211 to adjust the amount of peak reduction. The main baseband signal 100 is delayed in delay function 202 to produce delayed main baseband signal 251. The delayed main baseband signal 251 is gain adjusted in gain function 203 to produce delay and gain adjusted main baseband signal 252. The delay and gain adjusted main baseband signal 252 is subtracted from peak reduced baseband signal 250 in subtraction function 204 to produce baseband signal 253. The amount of delay 262 and gain adjustment 263 are calculated by the correlation function 205 that uses main baseband signal 100 and signal 253 as its inputs. The correlation block 205 also receives a control signal 261 from controller block 211 to use to calculate the delay adjustment value 262 and gain adjustment value 263. The baseband signal 253, subtraction of peak reduced main baseband signal and delay and gain adjusted main baseband signal, is applied to dynamically configurable code domain filter 207 to attenuate any out of band and unwanted signal and produce in-band baseband signal 254. The weighting parameters and values for dynamically configurable code domain filter 207 are supplied by a dynamically configurable mask within the controller 211. The masking information 266 from controller 211 used by dynamically configurable code domain filter 207 can be set during configuration or dynamically during operation. The in-band baseband signal 254 is gain adjusted by gain block 208 to produce gain adjusted in-band baseband signal 256. The amount of gain adjustment 265 is supplied by controller function 211. The main baseband signal 100 is delay and gain adjusted by delay/gain block 206 to produce delay and gain adjusted main baseband signal 255. The delay and gain adjusted main baseband signal 255 and the gain adjusted in-band baseband signal 256 are summed in summation function 209 to produce modified main baseband signal 257. The modified main baseband signal 257 is gain adjusted by gain function 210 to produce conditioned and smoothen baseband signal 300. The main baseband signal 100 and the conditioned and smoothen baseband signal 300 are applied to controller 211 to provide the gain and delay parameters needed for the gain and delay functions, peak reduction and the correlation functions. The controller 211 also gets modem information and external information to create the masking parameters and values for dynamically configurable code domain filter 207.

Figure 3:
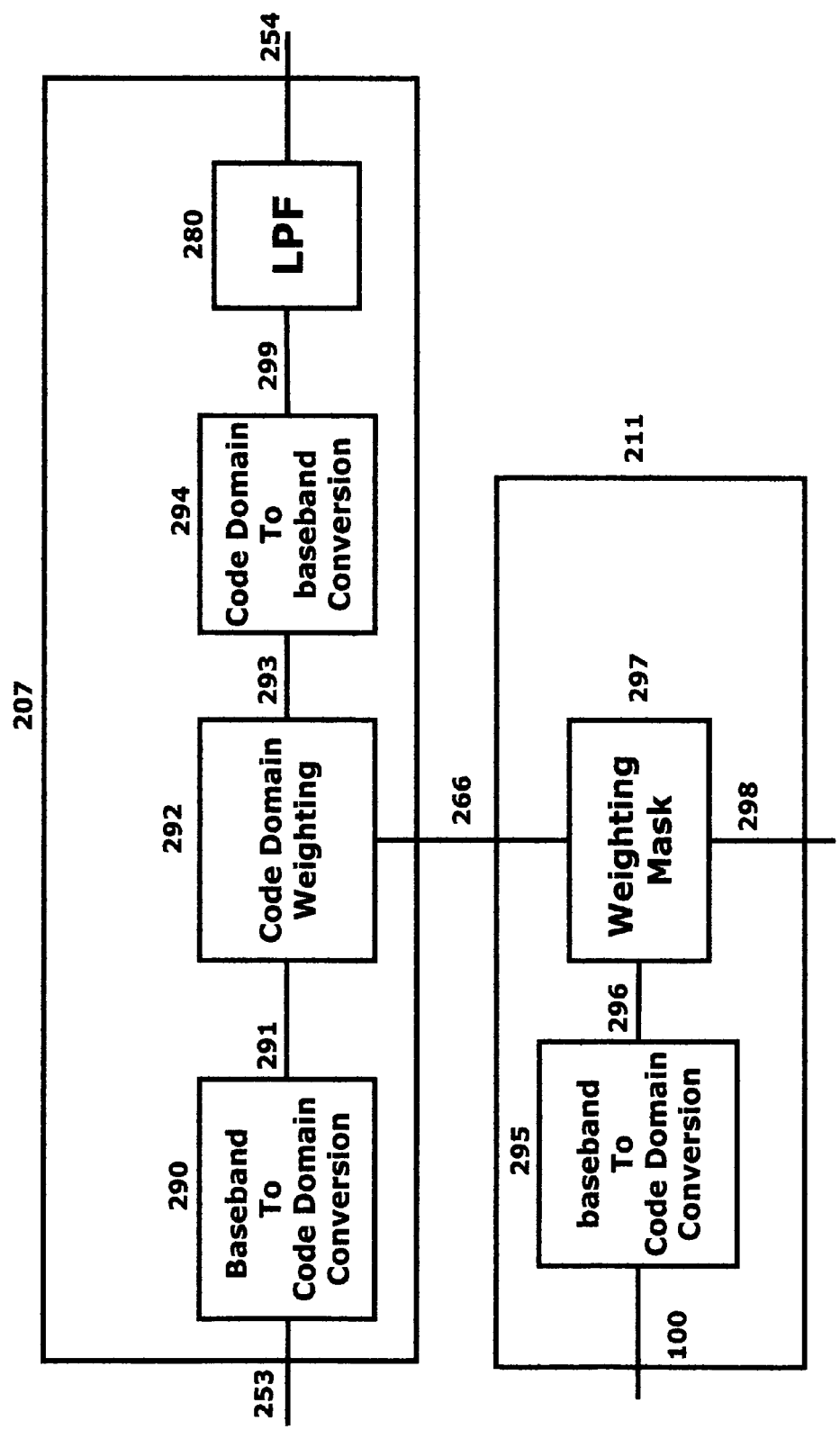
FIG. 3 is the detail block diagram of code domain filter using a detector to provide masking information

FIG. 3 illustrates the detail block diagram of the dynamically configurable code domain filter function 207 using CDMA baseband signal to provide the information for a dynamically configurable masking function. The baseband signal 253 which is the result of subtraction of delay and gain adjusted main baseband signal and peak reduced main baseband signal is applied to baseband to code domain conversion function 290 to produce the individual phase and magnitude of all of the available codes 291 within baseband signal 253. The individual phase and magnitude of all of the available codes 291 is adjusted and modified by the dynamically configured masking information 266 in weighting function 292 to produce new phase and magnitude for all of the individual available codes 293. The new individual phase and magnitude of all of the available codes 293 is used by code domain to baseband domain conversion function 294 to produce the new time domain baseband signal 299. The new time domain baseband signal 299 is low pass filtered by function 280 to produce the in band baseband signal 254. The main baseband signal 100 which is a CDMA signal is applied to a baseband signal to code domain conversion function 295 to detect the active codes, the modulation of active codes, the signal timing, and the level of the active codes within the CDMA signal. The information 296 from detector 295 is used to dynamically modify the parameters and values of masking function 297 in order to create the weighting information 266 for weighting function 292 within dynamically configurable code domain filter 207.

Figure 4:
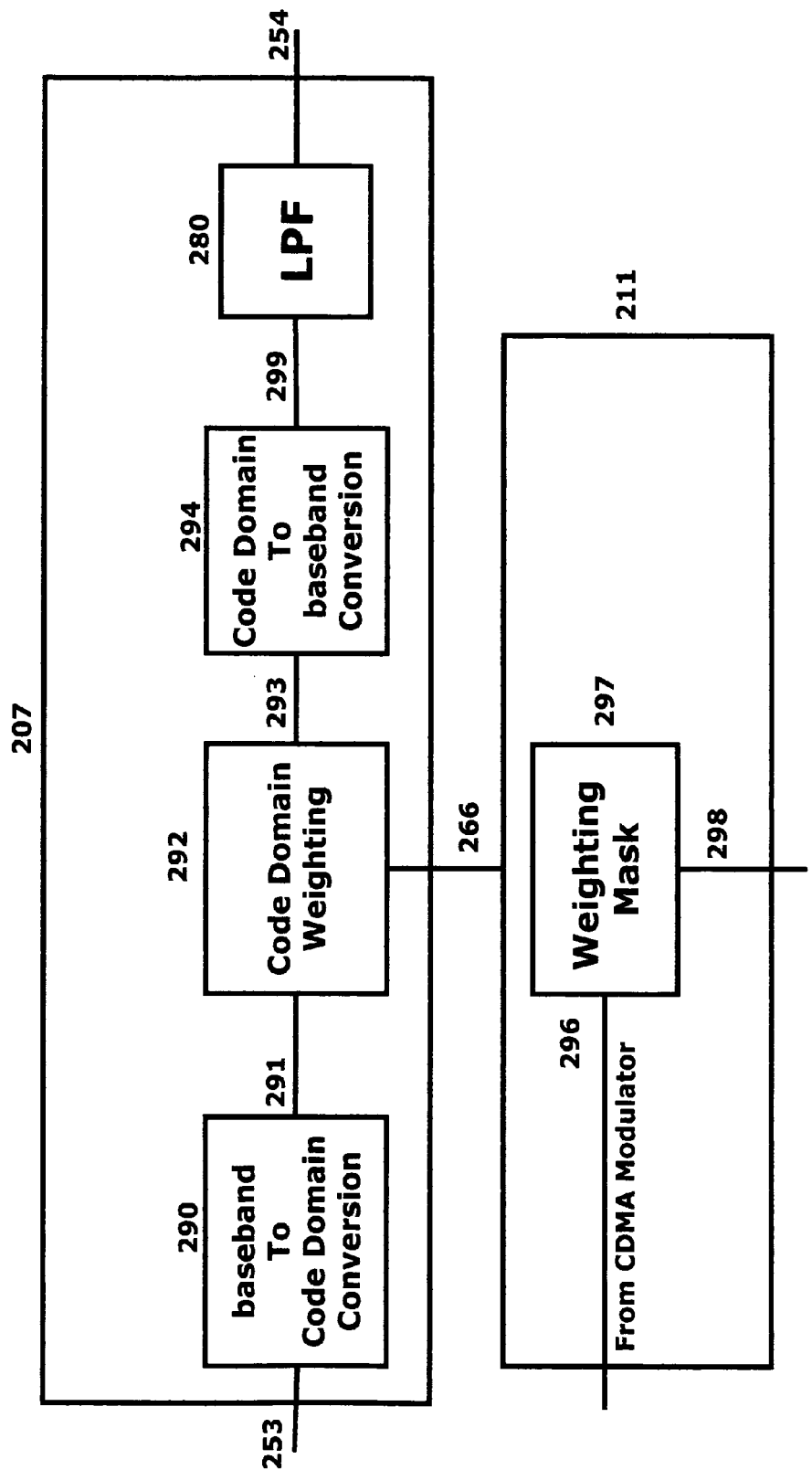
FIG. 4 is the detail block diagram of convolution filter using CDMA modem to provide masking information

FIG. 4 illustrates the detail block diagram of the dynamically configurable code domain filter function 207 using CDMA modem information for the dynamically configurable mask function. The baseband signal 253 which is the result of subtraction of delay and gain adjusted main baseband signal and peak reduced main baseband signal is applied to baseband to code domain conversion function 290 to produce the individual phase and magnitude of all of the available codes 291 within the baseband signal 253. The individual phase and magnitude of all of the available codes 291 is adjusted and modified by the dynamically configured masking information 266 in weighting function 292 to produce new individual phase and magnitude of all of the available codes 293. The new individual phase and magnitude of all of the available codes 293 is used by code domain to baseband domain conversion function 294 to produce the new time domain baseband signal 299. The new time domain baseband signal 299 is low pass filtered by low pass filter function 280 to produce the in band baseband signal 254. The CDMA modem provides the active codes, the modulation of active codes, the signal timing, and the level of the active codes information within the CDMA signal. This information 296 from CDMA modem is used to dynamically modify the parameters and values of masking function 297 in order to create the weighting information 266 for weighting function 292 within dynamically configurable code domain filter 207.

Figure 5:
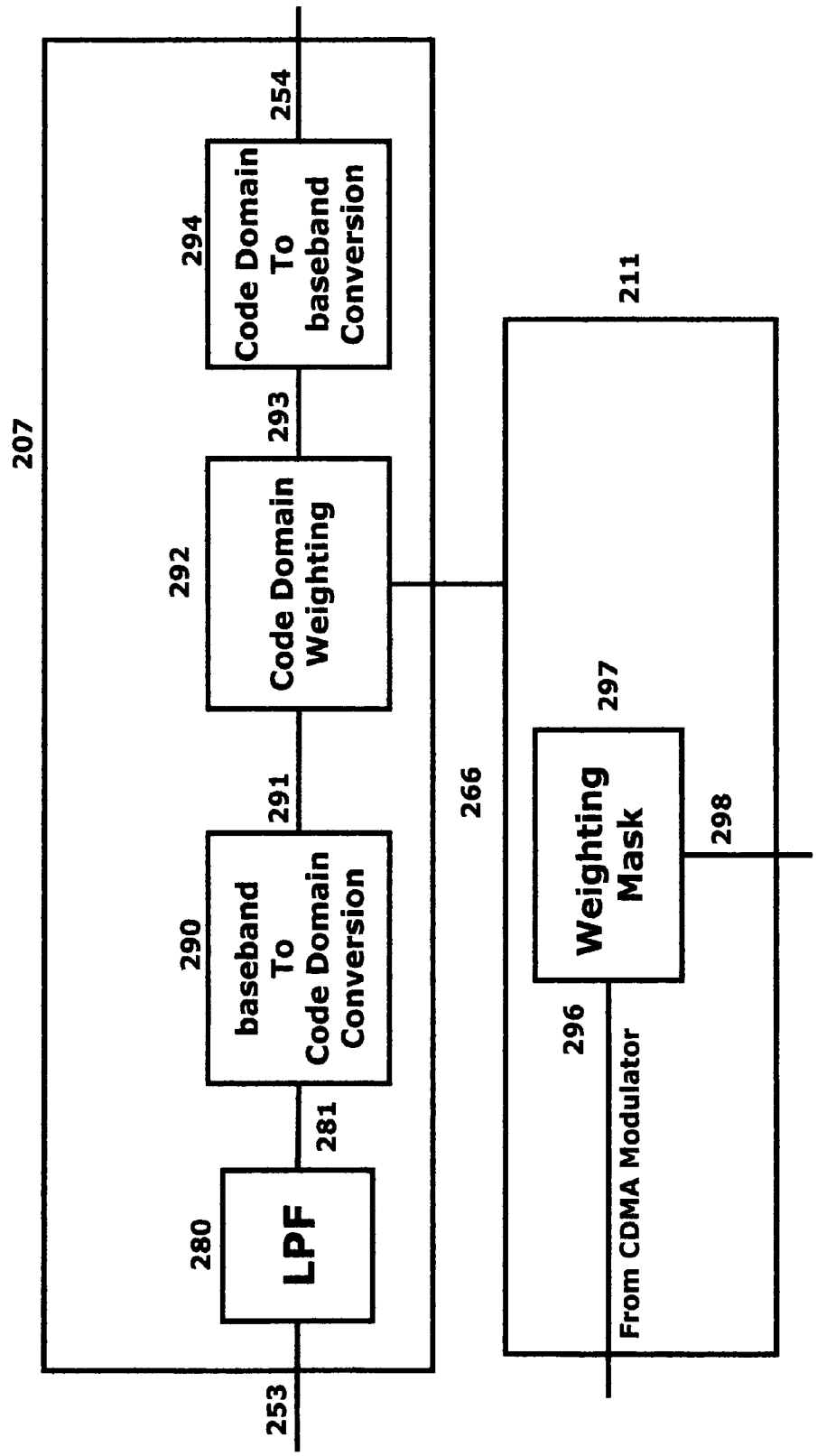
FIG. 5 is the detail block diagram of the convolution filter using CDMA modem information and filtered baseband signal

FIG. 5 illustrates the detail block diagram of the dynamically configurable code domain filter function 207 using CDMA modem information for the dynamically configurable mask function and low pass filtered baseband signal. The baseband signal 253 which is the result of subtraction of delay and gain adjusted main baseband signal and peak reduced main baseband signal is filtered by low pass filter 280 to produce baseband signal 281. The baseband signal 281 which is the low pass filtered result of subtraction of delay and gain adjusted main baseband signal and peak reduced main baseband signal is applied to baseband to code domain conversion function 290 to produce the individual phase and magnitude of all of the available codes 291 within the baseband signal 281. The individual phase and magnitude of all of the available codes 291 is adjusted and modified by the dynamically configured masking information 266 in weighting function 292 to produce new individual phase and magnitude of all of the available codes 293. The new individual phase and magnitude of all of the available codes 293 is used by code domain to baseband domain conversion function 294 to produce the time domain in band baseband signal 254. The CDMA modem provides the active codes, the modulation of active codes, the signal timing, and the level of the active codes information within the CDMA signal. This information 296 from CDMA modem is used to dynamically modify the parameters and values of masking function 297 in order to create the weighting information 266 for weighting function 292 within dynamically configurable code domain filter 207.

What is claimed is:

1. An equalizer filter with dynamically configurable code domain filter, to condition and smoothen a main baseband signal to improve the performance of a transmit path, for use with Code Domain Multiple Access (CDMA) signals to enhance the performance of any communication transmitter, in any wireless cellular, Personal Communication System (PCS), wireless Local Area Network and Wireless Wide Area Network (LAN/WAN), Video and Audio Wireless Broadcasting, line of sight point-to-point microwave, military, satellite communication systems and any other wireless applications, the equalizer filter with dynamically configurable code domain filter comprising:
   a peak reduction filter to produce a peak reduced main baseband signal;
   a feedforward loop that injects a controlled in band and out of band baseband signal into the main baseband signal to produce an injected baseband signal;
   a first gain element that adjusts the gain of sum of a delay and gain adjusted main baseband signal and the injected baseband signal;

a controller that uses the main baseband signal, the output of the equalizer filter with dynamically configurable code domain filter, and external information to provide control signal to various delay and gain functions as well as peak reduction filter, the correlation function and a code domain filter function;

wherein the feedforward loop comprising:

a delay element that adjusts the delay of the main baseband signal to produce a delayed main baseband signal;

a second gain element that adjusts the gain of the delayed main baseband signal to produce a gain adjusted delayed main baseband signal;

a subtracting element that subtracts the gain adjusted delayed main baseband signal and the peak reduced main baseband signal;

a correlator that correlates the main baseband signal and the result of the subtraction of the gain adjusted delayed main baseband signal and the peak reduced main baseband signal to calculate the amount of the delay adjustment for the main baseband signal in a feedforward loop and the gain adjustment for the delayed main baseband signal;

a dynamically configurable code domain filter that filters the result of the subtraction of the gain adjusted delayed main baseband signal and the peak reduced main baseband signal in a feedforward loop before injection into the main baseband signal to produce a code domain filtered signal;

a third gain element that adjusts the code domain filtered signal to produce the injected baseband signal;

a delay/gain adjustment element that delays and gain adjusts the main baseband signal;

a summing element that adds the delay and gain adjusted main baseband signal and the injected baseband signal.

2. The equalizer filter with dynamically configurable code domain filter according to claim 1, wherein the digital baseband code domain filter uses a baseband to code domain conversion function and a code domain weighting function and a code domain to baseband conversion function to perform code domain filter function, a dynamically configurable baseband code domain filter comprising:

a low pass filter to filter the subtraction of the gain adjusted delayed main baseband signal and the peak reduced main baseband signal;

a baseband to code domain conversion element to convert the subtraction of the gain adjusted delayed main baseband signal and the peak reduced main baseband signal to code domain by calculation the magnitude and phase of each individual code and produces a code domain of the subtraction of the delay and gain adjusted main baseband signal and the peak reduced main baseband signal;

a code domain weighting element that weights the magnitude and phase of each individual code domain code and produces a weighted code domain of the subtraction of the delay and gain adjusted main baseband signal and the peak reduced main baseband signal;

wherein the code domain weighting element obtains its weighting parameters and values from a masking function within a controller function;

a code domain to baseband conversion element that converts the weighted code domain of the subtraction of the delay and gain adjusted main baseband signal and the peak reduced main baseband signal to baseband and produces a code domain filtered subtraction of the delay and gain adjusted main baseband signal and the peak reduced main baseband signal;

a low pass filter to shape the new code domain filtered subtraction of the delay and gain adjusted main baseband signal and the peak reduced main baseband signal.

3. The equalizer filter with dynamically configurable code domain filter according to claim 1, wherein the digital baseband code domain filter uses a code domain weighting function that gets its weighting parameters and values from a dynamically configurable weighting mask within a controller, a controller comprising:

a detector or baseband to code domain conversion function that uses the main baseband signal to detect the timing of the CDMA signal, CDMA active codes, type of modulation of the CDMA active codes and the level or magnitude of the CDMA active codes;

a weighting mask element that uses the information detected by the detector or baseband to code domain conversion function, CDMA timing, CDMA active codes, type of the modulation of the CDMA active codes and the magnitude of the CDMA active codes to generate the code domain weighting parameters and values for a code domain weighting function;

wherein the weighting mask element uses the information from a CDMA modem, CDMA timing, CDMA active codes, type of the modulation of the CDMA active codes and the magnitude of the CDMA active codes to generate the code domain weighting parameters and values for a code domain weighting function.

4. The equalizer filter with dynamically configurable code domain filter according to claim 1, wherein the digital baseband dynamically configurable code domain filter that receives a weighting mask element to produce weighting parameters and values for the weighting function within the dynamically configured code domain filter, the weighting mask element comprising:

generating weighting parameters and values for the code domain filter using the information supplied by a main baseband CDMA modulator;

generating weighting parameters and values for the code domain filter using the information supplied by a detector, demodulator or baseband to code domain converter using main baseband CDMA signal as its input;

receiving the main baseband CDMA signal timings information, main baseband CDMA signal active codes information, main baseband CDMA signal modulation used by active codes information, main baseband CDMA signal active codes magnitude information, main baseband CDMA signal active pilot code information, main baseband CDMA signal active synchronization code information, main baseband CDMA signal active control channel code information, main baseband CDMA signal active paging channel code information, main baseband CDMA signal active training and preamble code information, the main baseband CDMA signal idle codes information, and the main baseband CDMA signal peak reduction codes information provided by the CDMA modulator to generate a mask containing the weighting parameters and values for a dynamically configurable code domain filter;

receiving the main baseband CDMA signal timings information, main baseband CDMA signal active codes information, main baseband CDMA signal modulation used by active codes information, main baseband CDMA signal active codes magnitude information, main baseband CDMA signal active pilot code information, main baseband CDMA signal active synchronization code information, main baseband CDMA signal active control channel code information, main baseband CDMA signal active paging channel code information, main baseband CDMA signal active training and preamble code information, the main baseband CDMA signal idle codes information, and the main baseband CDMA signal idle codes information provided by the CDMA detector, demodulator or baseband to code domain converter using the main CDMA baseband signal as its input to generate a mask containing the weighting parameters and values for a dynamically configurable code domain filter;

generating a weighting mask having code's weights with different values defined by the information supplied by the baseband CDMA detector or demodulator or baseband to code domain converter output;

generating a weighting mask having code's weights with different values defined based on the modulation of the active codes defined by the information supplied by the baseband CDMA modulator output;

generating a weighting mask having code's weights with different values defined based on the modulation of the active codes defined by the information supplied by the baseband CDMA detector or demodulator or baseband to code domain converter output;

generating a weighting mask having code's weights with different values defined based on the magnitude of the active codes defined by the information supplied by the baseband CDMA modulator output;

generating a weighting mask having code's weights with different values defined based on the magnitude of the active codes defined by the information supplied by the baseband CDMA detector or demodulator or baseband to code domain converter output;

generating a weighting mask having code's weights with different values defined based on the type of the active codes defined by the information supplied by the baseband CDMA modulator output;

generating a weighting mask having code's weights with different values defined based on the type of the active codes defined by the information supplied by the baseband CDMA detector or demodulator or baseband to code domain converter output;

generating a weighting mask having code's weights with different values defined based on the combination of modulation, magnitude and type of the active codes defined by the information supplied by the baseband CDMA modulator output;

generating a weighting mask having code's weights with different values defined based on the combination of modulation, magnitude and type of the active codes defined by the information supplied by the baseband CDMA detector or demodulator or baseband to code domain converter output.

5. The equalizer filter with dynamically configurable code domain filter according to claim 1, wherein a controller using the input and the output of the equalizer filter controls the delay and gain adjustment functions used in conditioning equalizer filter, and provides the weighting mask for the code domain filter using CDMA modulator or modem information or the information provided by a CDMA baseband detector, demodulator or baseband to code domain converter.

6. The equalizer filter with dynamically configurable code domain filter according to any one of claims 1 to 5, is implemented in a wireless communication transmitter, in wireless cellular, wireless PCS, wireless LAN, Wireless WAN, Wireless Broadband, microwave, wireless satellite, wireless audio and video broadcasting, and any wireless communication systems used for military applications.

7. The equalizer filter with dynamically configurable code domain filter according to any one of claims 1 to 5, wherein the equalizer filter with dynamically configurable code domain filter is implemented in programmable logic, Field Programmable Gate Array (FPGA), Gate Array, Application Specific Integrated Circuit (ASIC), and DSP processor.

* * * * *